(12) United States Patent
Andresen et al.

(10) Patent No.: US 7,264,770 B2
(45) Date of Patent: Sep. 4, 2007

(54) MITIGATION OF STRESS CORROSION CRACKING OF STRUCTURAL MATERIALS EXPOSED TO A HIGH TEMPERATURE WATER

(75) Inventors: Peter Louis Andresen, Schenectady, NY (US); Young-Jin Kim, Clifton Park, NY (US); Sam Hettiarachchi, Menlo Park, CA (US); Thomas Pompilio Diaz, San Martin, CA (US); Thomas Martin Angeliu, Clifton Park, NY (US); Martin Mathew Morra, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 187 days.

(21) Appl. No.: 11/120,478

(22) Filed: May 2, 2005

(65) Prior Publication Data

US 2006/0243602 A1    Nov. 2, 2006

(51) Int. Cl.
*C23F 11/18*   (2006.01)
(52) U.S. Cl. .............. 422/7; 422/11; 422/12; 422/14; 422/19; 376/277; 376/305; 376/306

(58) Field of Classification Search .............. 422/7, 422/11, 12, 14, 19; 376/277, 305, 306
See application file for complete search history.

(56) References Cited

U.S. PATENT DOCUMENTS

| | | | |
|---|---|---|---|
| 5,673,297 A * | 9/1997 | Andresen | 376/306 |
| 6,714,618 B1 | 3/2004 | Hettiarachchi et al. | 376/306 |
| 6,793,883 B2 * | 9/2004 | Andresen et al. | 422/7 |
| 2002/0101953 A1 | 8/2002 | Hettiarachchi et al. | 376/306 |

* cited by examiner

*Primary Examiner*—Bruce F. Bell
(74) *Attorney, Agent, or Firm*—Fletcher Yoder

(57) ABSTRACT

A method for mitigating stress corrosion cracking of a component exposed to a high temperature water in a high temperature water system is provided. The method comprises the steps of lowering corrosion potential conditions to a desired low corrosion potential in the high temperature water environment; and introducing a first material comprising zinc into the high temperature water environment, such that the desired low corrosion potential facilitates transport of the first material into cracks in a structure communicative with the high temperature water environment.

24 Claims, 8 Drawing Sheets

MITIGATION OF STRESS CORROSION CRACKING OF STRUCTURAL MATERIALS EXPOSED TO A HIGH TEMPERATURE WATER

BACKGROUND

The invention relates generally to mitigating stress corrosion cracking of components exposed to high temperature water in a high temperature water system. More particularly, certain embodiments of the invention utilize the synergetic benefit of zinc and low corrosion potential in mitigating stress corrosion cracking in high temperature water systems.

In many applications, such as nuclear reactors, steam driven turbines, or water deaerators, high temperature waters adversely affect the structures by causing stress corrosion cracks, corrosion, erosion, and so forth. For example, high temperature waters may cause stress corrosion cracking (SCC) in materials, such as carbon steel, alloy steel, stainless steel, nickel-based alloys, cobalt-based alloys, and zirconium-based alloys. Stress corrosion cracking includes cracks propagated by static or dynamic tensile stresses acting in combination with corrosion at a crack tip. These stresses can result or originate from differences in thermal expansion or contraction between components, relatively high or varying operating pressures, or various processes performed during the manufacture or assembly of the components or system. For example, residual stresses often result from welding, cold working, and other thermomechanical metal treatments. Water chemistry, welding, heat treatment, and radiation may also increase the susceptibility of a metal or alloy component to stress corrosion cracking.

Stress corrosion cracking occurs at greater rates under various conditions, such as the presence of oxygen, high radiation flux, and so forth. In nuclear reactors like pressurized water reactor (PWR) and boiling water reactor (BWR), a high radiation flux causes radiolytic decomposition of the reactor water, this decomposition produces oxygen, hydrogen peroxide, short-lived radicals, and various oxidizing species. These products of radiolytic decomposition promote stress corrosion cracking in the various system components, such as pipes, pumps, valves, turbines, and so forth. Operating temperatures and pressure for a boiling water reactor are typically about 288° C. and about 7 MPa; and those for a pressurized water reactor ("PWR") are about 320° C. and about 15 MPa. Thus, the chance for stress corrosion cracking in reactor components is heightened.

One method of mitigating stress corrosion cracking of susceptible material in boiling water reactor is through the application of hydrogen water chemistry (HWC), which involves the addition hydrogen gas to the reactor feedwater. Addition of hydrogen reduces the level of oxidizing species, such as dissolved oxygen and hydrogen peroxide, thereby reducing the stress corrosion cracking susceptibility. Unfortunately, the hydrogen water chemistry technique often demands large quantities of hydrogen, to effectively reduce the stress corrosion cracking susceptibility to acceptable levels in the various components. Hydrogen demand can be reduced by coating or alloying the components with a noble metal catalyst. Despite the reduced hydrogen demands, there exists more efficient means of reducing stress corrosion cracking in certain high strength materials, such as cold worked, precipitation hardened, or irradiated materials.

Therefore, there exists a need for new approaches to mitigate stress corrosion cracking and to reduce the operating dose rate in nuclear reactors.

BRIEF DESCRIPTION

Embodiments of the present invention fulfill these and other needs by providing a method and a system for reducing the electrochemical corrosion potential of components exposed to high temperature water.

In one aspect, the invention provides a method for mitigating stress corrosion cracking of a component exposed to a high temperature water in a high temperature system. The method comprises the steps of reducing the electrochemical corrosion potential conditions to a desired low potential in the high temperature water environment; and introducing a first material comprising zinc into the high temperature water environment, such that the desired low corrosion potential facilitates the transport of the first material into cracks in a structure communicative with the high temperature water environment.

DRAWINGS

These and other features, aspects, and advantages of the present invention will become better understood when the following detailed description is read with reference to the accompanying drawings in which like characters represent like parts throughout the drawings, wherein.

Figure 3:
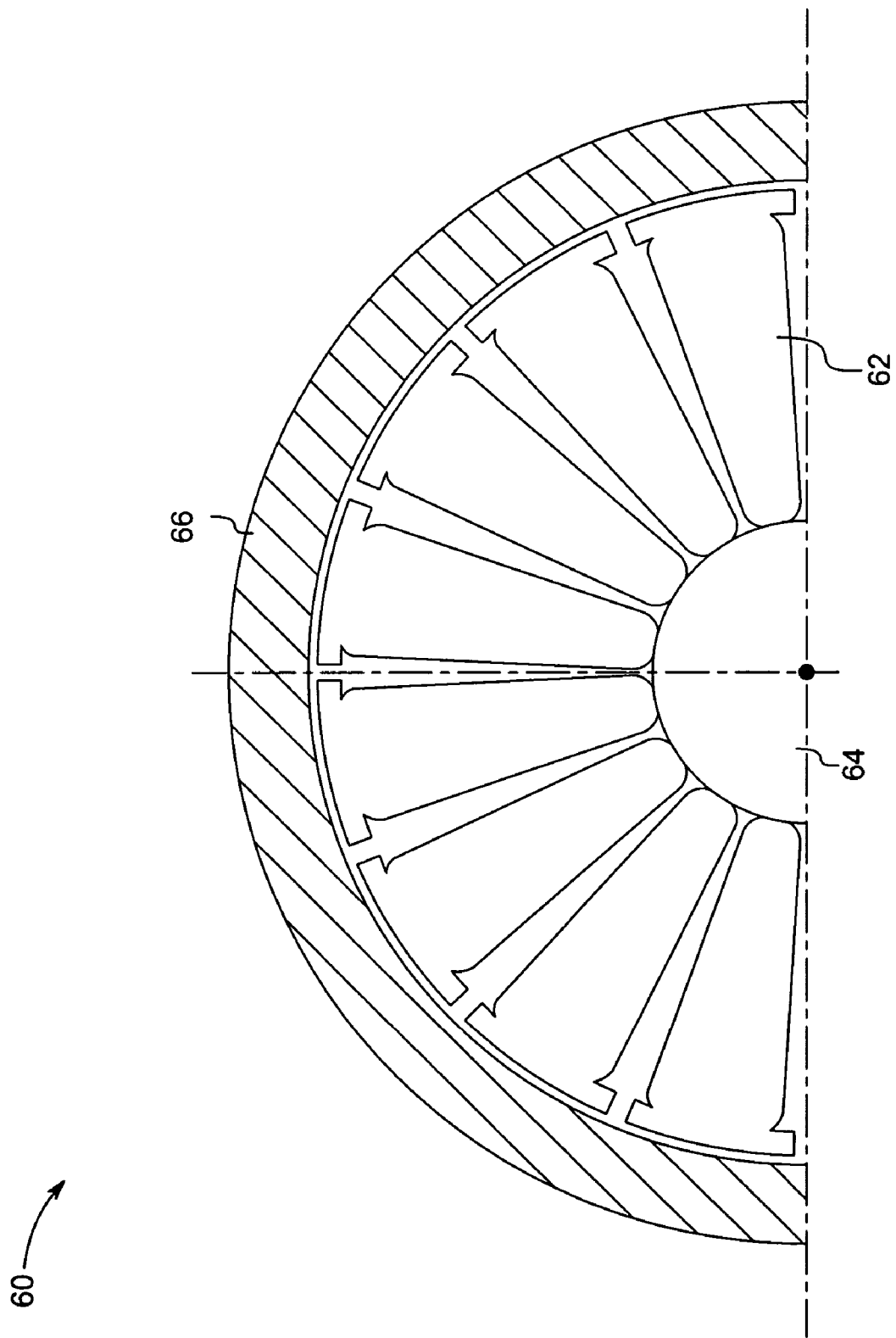
Figure 11:
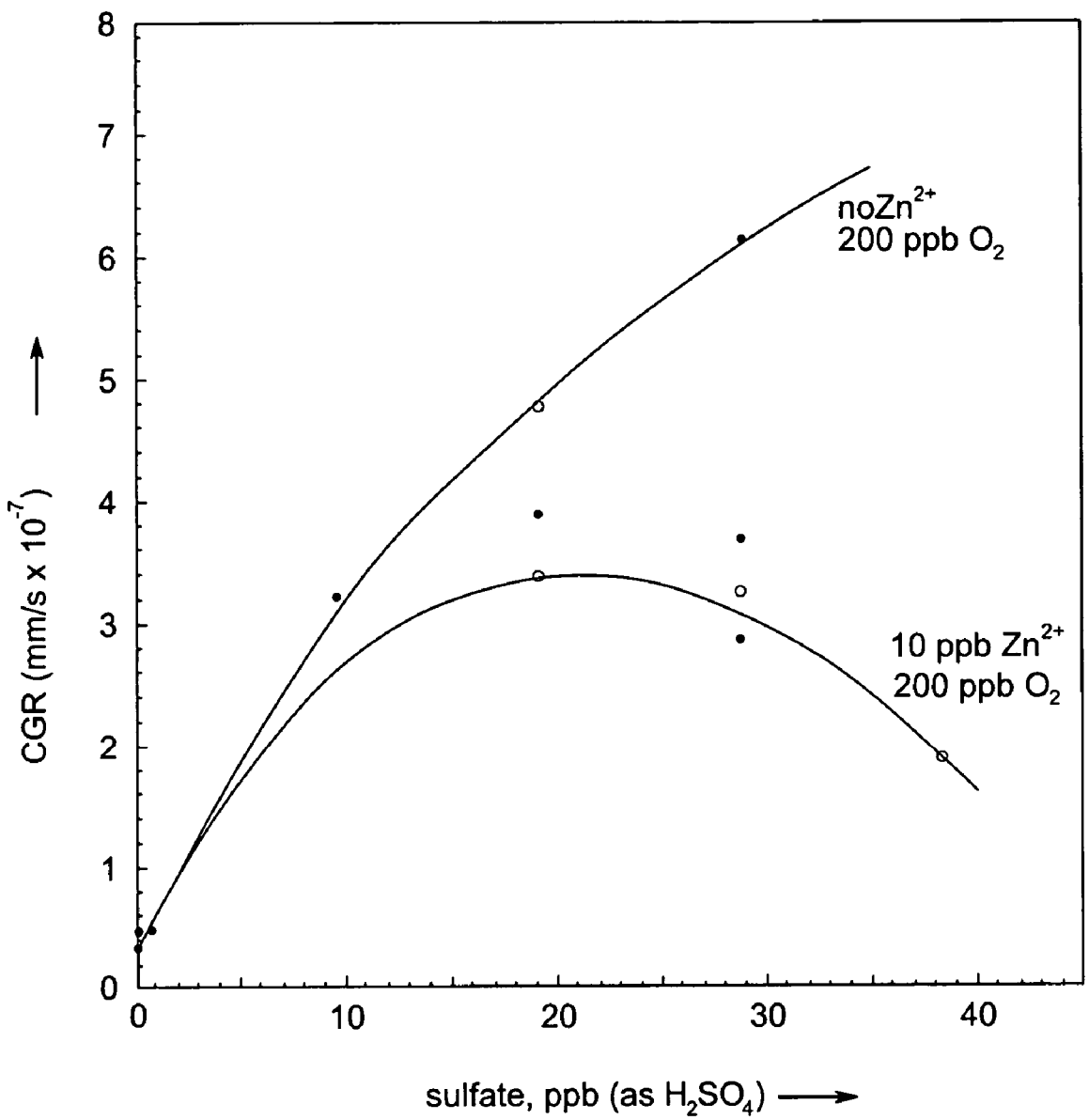

FIG. 3 is a schematic showing a partially cutaway perspective view of a turbine having certain characteristics in accordance with embodiments of the present invention; and FIGS. 4, 5, 6, 7, 8, 9 and 10 are flow charts illustrating various methods for mitigating stress corrosion cracking of a component exposed to a high temperature water in a high temperature water system according to certain embodiments of the present invention;

FIG. 11 is a graph illustrating the effect of dissolved zinc on crack growth rate of sensitized alloy 600.

Figure 12:
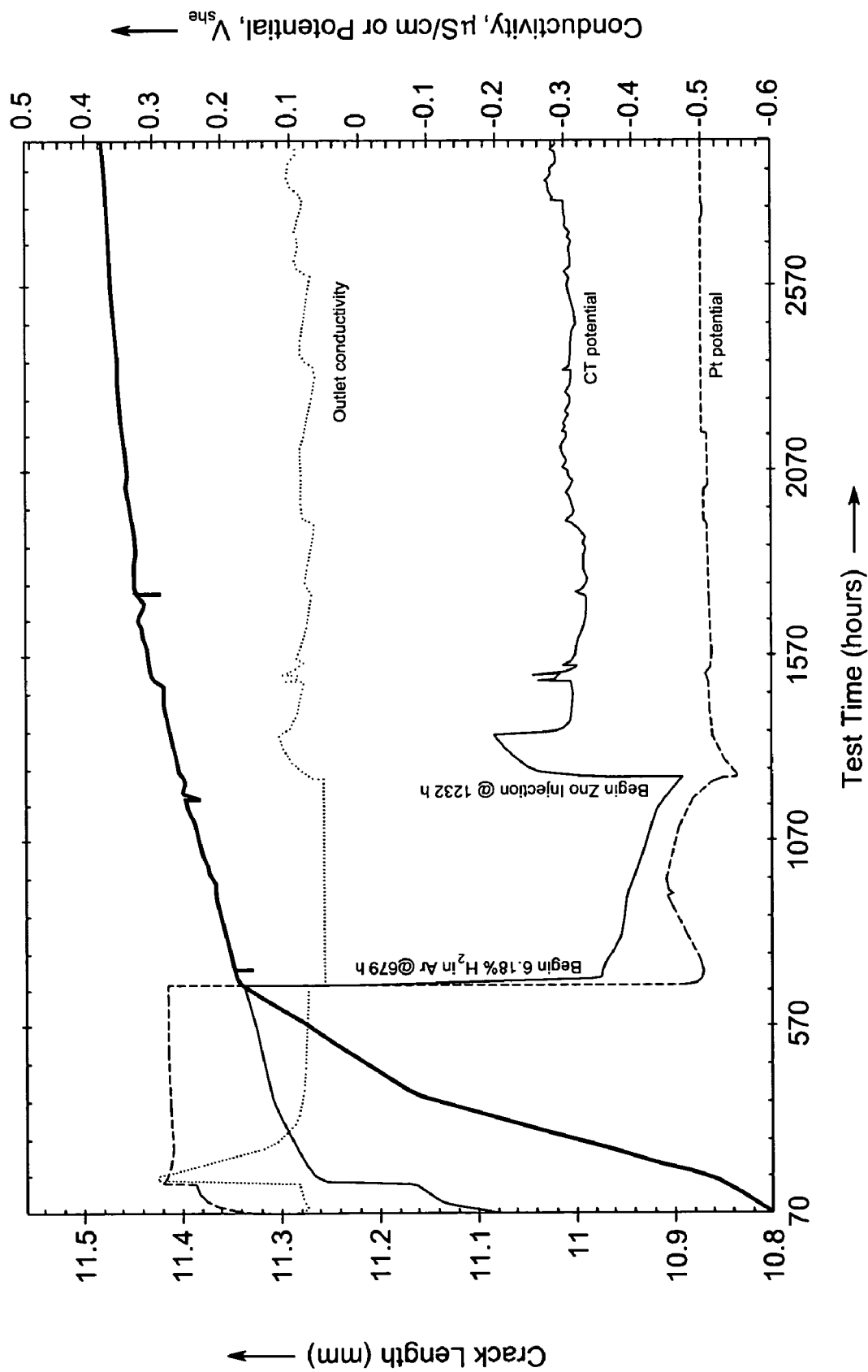

FIG. 12 is a plot of stress corrosion crack length verses time that illustrate the effect of zinc in reducing the crack growth rate of 316 SS in high temperature water.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group. Referring to the drawings in general, it is to be understood that the illustrations are for the purpose of describing a preferred embodiment of the invention and are not intended to limit the invention thereto.

In various systems and devices, stress corrosion cracking is substantially reduced or mitigated by lowering the corrosion potential (e.g., by applying noble metals, hydrogen, etc.) and applying zinc, such that the lowered corrosion potential enables zinc to penetrate or incorporate more easily into oxide films of the various structures (e.g., pipes, turbines, pressure vessels, etc.). The greater penetration/incorporation of zinc into the oxides and cracks reduces or mitigates stress corrosion cracking beyond that provided by lowering the corrosion potential. As a result, stress corrosion cracking of high strength materials, such as cold worked, precipitation hardened, or irradiated materials, can be adequately mitigated by combining these techniques of lower corrosion potential and applying zinc. In certain embodiments, as discussed in further detail below, a high temperature water system is treated with nanoparticles of a material comprising zinc, i.e., zinc nanoparticles. Moreover, catalytic nanoparticles, such as nanoparticles of a material comprising noble metals, can be applied to the system to lower the corrosion potential. These techniques are discussed in further detail below with respect to several possible applications, among others, that may benefit from a combined lowering of corrosion potential and zinc application.

Figure 1:
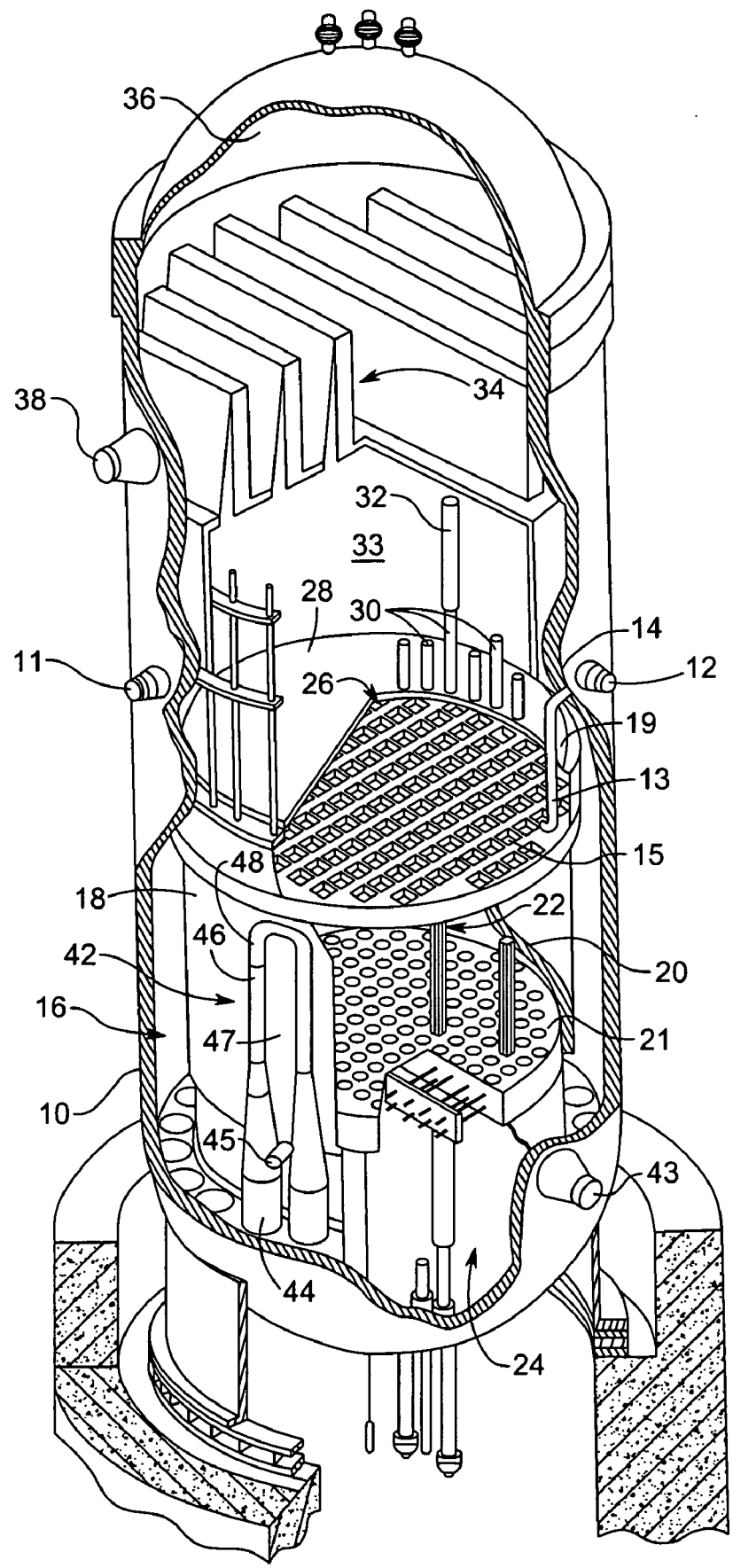
FIG. 1 is a schematic showing a partially cutaway perspective view of a conventional boiling water reactor having certain characteristics in accordance with embodiments of the present invention.

For example, FIG. 1 illustrates an exemplary embodiment of a boiling water reactor treated to lower the corrosion potential and propagate zinc into the wetted portions of the reactor internals. In operation of this boiling water reactor, feedwater is admitted into a reactor pressure vessel 10 via a feedwater inlet 12 and a feedwater sparger 14, which is a ring-shaped pipe having suitable apertures for circumferentially distributing the feedwater inside the reactor pressure vessel. A core spray inlet 11 supplies water to a core spray sparger 15 via core spray line 13. The feedwater from feedwater sparger 14 flows downwardly through a downcorner annulus 16, which is an annular region between reactor pressure vessel 10 and a core shroud 18.

The illustrated core shroud 18 is a stainless steel cylinder surrounding a core 20, which comprises numerous fuel assemblies 22 (only two 2×2 arrays of which are depicted in FIG. 1). Each fuel assembly 22 is supported by a top guide 19 and a bottom core plate 21. Water flowing through downcorner annulus 16 then flows to the core lower plenum 24. The water subsequently enters the fuel assemblies 22 disposed within core 20, wherein a boiling boundary layer (not shown) is established. A mixture of water and steam enters core upper plenum 26 under shroud head 28. Core upper plenum 26 provides a standoff or separation between the steam-water mixture exiting the core 20 and entering vertical standpipes 30, which are disposed above the shroud head 28 and in fluid communication with core upper plenum 26.

The steam-water mixture flows through standpipes 30 and enters steam separators 32, e.g., axial-flow centrifugal type separators. The separated liquid water then mixes with feedwater in the mixing plenum 33, and the mixture then returns to the core 20 via the downcorner annulus 16. The steam passes through steam dryers 34 and enters steam dome 36. The steam is withdrawn from the reactor pressure vessel via steam outlet 38.

The boiling water reactor also includes a coolant recirculation system that provides sufficient forced convective flow through the core 20 to attain the desired power density. A portion of the water is pulled from the lower end of the downcorner annulus 16 via recirculation water outlet 43 and forced by a centrifugal recirculation pump (not shown) into jet pump assemblies 42 (only one of which is shown) via recirculation water inlets 45. The illustrated boiling water reactor has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence. A typical boiling water reactor has 16 to 24 inlet mixers.

Figure 2:
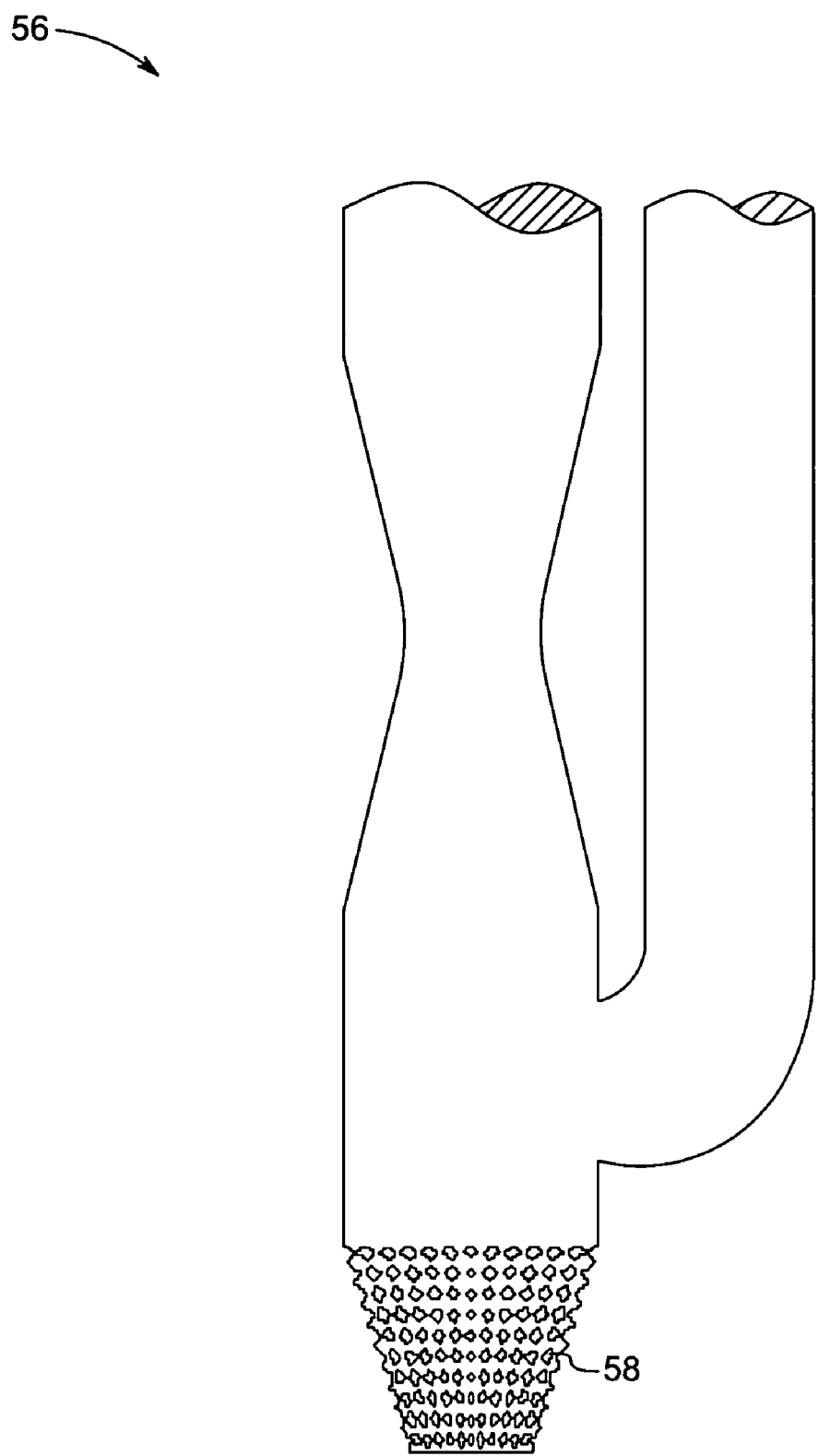
FIG. 2 is a schematic of a jet pump having certain characteristics in accordance with embodiments of the present invention.

Although described with respect to a boiling water reactor, embodiments of the present invention are not limited to use within a boiling water nuclear reactor. Rather, embodiments of the invention may be utilized in other systems in which structural components are exposed to high temperature water environments or corrosion prone environments. Such structures include pressurized water nuclear reactors (PWRs), steam/gas-driven turbines, water deaerators, jet pumps, steam boilers, heat exchangers, supercritical steam boilers, process or cooling water piping, and the like. A schematic of a jet pump 56 is shown in FIG. 2. The components of a jet pump 56, especially the nozzle 58, are exposed to high temperature water flowing at a high speed and are susceptible to stress corrosion cracking. A cross sectional schematic of a turbine 60 is shown in FIG. 3. A turbine converts the kinetic energy of a moving fluid (liquid or gas) into mechanical energy. The illustrated turbine has a series of blades 62 mounted on a shaft or disk 64 against which steam is forced, thus rotating the shaft connected to a generator. Stress corrosion cracking is a significant performance problem with turbine components, such as the blades 62 and dovetails and shroud 66, particularly when the moving fluid is a hot liquid. Previously attempted efforts to mitigate stress corrosion cracking may not be effective especially when the components are made of high yield strength materials, such as cold worked, precipitation hardened, or irradiated materials. As introduced above and discussed in further detail below, embodiments of the present technique mitigate stress corrosion cracking in a variety of materials and corrosive environments by lowering the corrosion potential in combination with applying a zinc material, such that the lowered corrosion potential enables the zinc material to penetrate more effectively into crevices or cracks.

As used in the following discussion, the term "high temperature water" may include water having a temperature between 50° Celsius and about 350° Celsius and, preferably, between about 50° Celsius and about 300° Celsius. Also any two-phase fluid including vapor and liquid phases containing water. Nanoparticles may include particles having a size primarily less than 100 nm and an average particle size below 500 nm. In certain embodiments, the primary particle size is less than 50 nm or, even smaller, less than 10 nm. In some embodiments, the average particle size is less than 250 nm, or smaller, less than 100 nm, or even smaller less than 50 nm. Electrochemical corrosion potential, which is caused by a flow of electrons from anodic to cathodic areas on metallic surfaces, is a measure of the thermodynamic tendency for corrosion to occur, and is a fundamental parameter in determining stress corrosion cracking. Low corrosion potential refers to corrosion potentials lower than the potentials under normal operation conditions in operating boiling water reactors, which is generally about 100 to about 200 millivolts. In some embodiments, the corrosion potential lower than 100 millivolts (with respect to standard hydrogen electrode). In some embodiments, with respect to a standard hydrogen electrode, the corrosion potential is relatively lower than 0 millivolts, or lower than −200 millivolts, or even lower than −500 millivolts.

Figure 4:
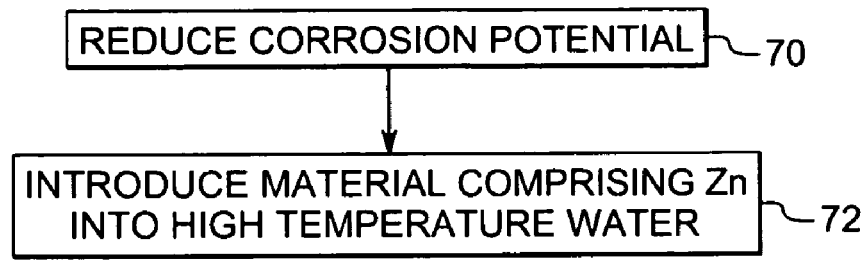

In accordance with one embodiment of the invention, FIG. 4 is a flow chart illustrating a method 68 to mitigate stress corrosion cracking of a component exposed to a high temperature water in a high temperature water system. The illustrated method 68 includes reducing corrosion potential conditions to a desired low corrosion potential in the high temperature water environment in block 70; and introducing a first material including zinc into the high temperature water environment, such that the desired low corrosion potential facilitates transport of the first material into cracks or crevices in a structure communicative with the high temperature water environment in block 72. In certain embodiments, zinc additions in a variety of forms e.g., salts of zinc, oxides of zinc, organo-metallic zinc compounds become ionic (e.g., $Zn^{++}$ and $ZnOH^+$) in hot water and, thus, the transport of zinc into a crack is inhibited by the presence of a high corrosion potential (which drives negative ions into the crack, and positive ions like $Zn^{++}$ out of the crack). In accordance with embodiments of the present invention, zinc introduced under low corrosion potential conditions (as compared to normal corrosion potential conditions) is effective in penetrating zinc to a relatively greater extent with relatively less resistance into small crevices, thereby mitigating stress corrosion cracking.

Reduction of corrosion potential to a desirable low value may be achieved by a variety of techniques. For example, the desired low corrosion potential conditions may be achieved by hydrogen injection, by achieving oxidant-free conditions, or by applying an insulating material, or a noble metal catalyst in combination with, or a combination low hydrogen injection.

Figure 5:
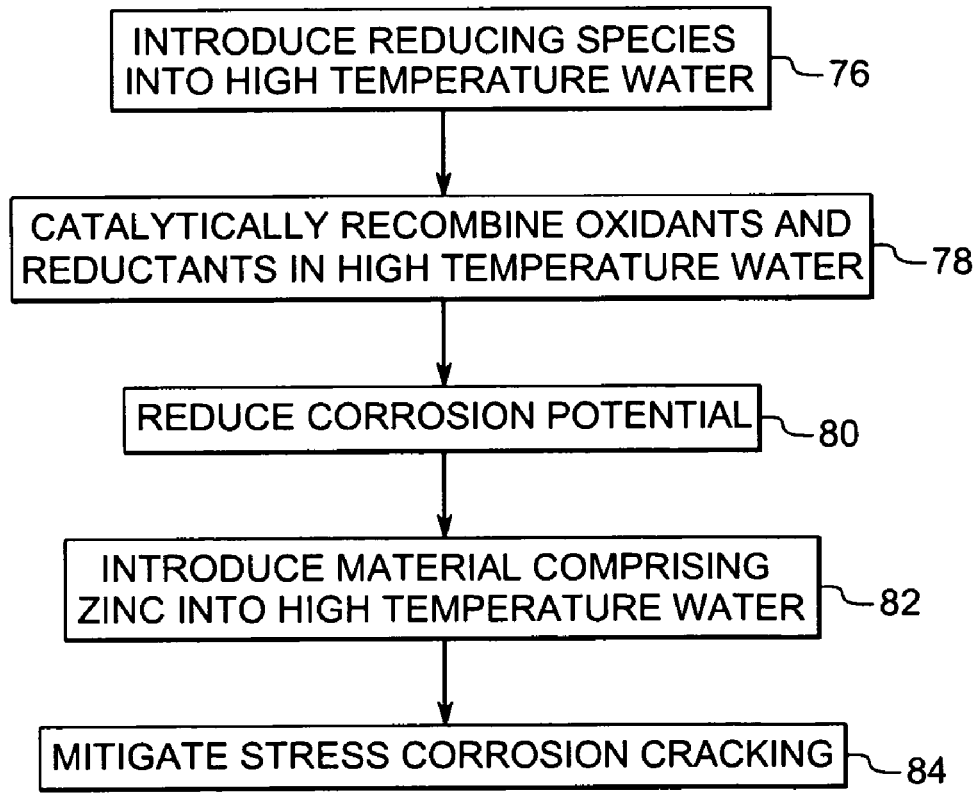

In some embodiments, lowering the corrosion potential can be accomplished by introducing a reducing species into the high temperature water. Reducing species generally refer to species that react with oxidizing species to form water or other stable species. Non-limiting examples of reducing species include hydrogen, alcohol, hydrazine, ammonia, and combinations thereof. For example, a desired amount of hydrogen gas may be introduced into the feed water. Reference may be made to FIG. 5, which illustrates a flow chart of a method 74 to mitigate stress corrosion cracking according to one embodiment of the invention. The method involves introducing reducing species into the high temperature water in step 76. When the reducing species reach the reactor vessel, it reacts with the radiolytically formed oxidizing species such as oxygen and hydrogen peroxide to reform water as represented in block 78. In turn, the reaction 78 lowers the concentration of dissolved oxidizing species in the water in the vicinity of metal surfaces, thereby reducing corrosion potential as depicted in block 80. Material including zinc is introduced into the high temperature water as shown in block 82. Under low corrosion potential conditions the added zinc can penetrate easily into cracks and prevent crack propagation that leads to mitigation of stress corrosion cracking. In certain embodiments, a material comprising zinc may include zinc, or zinc oxide, or zinc nitrate, or zinc acetate or other zinc containing organo-metallic compound, or combinations thereof. In some embodiments zinc introduced is in the form of nanoparticles. The material comprising zinc may be introduced in the form of a powder, a pellet, a non-dispersed metallic form, a coated substrate, or a coating, or chemical or mechanical alloy, partially saturated solution, saturated solution, or a colloidal suspension, or a combination thereof. The rate of these recombination reactions depends on the local radiation fields, water flow rates, and other variables and, hence, the amount of hydrogen for the reactions varies from region to region within the high temperature water system.

Figure 6:
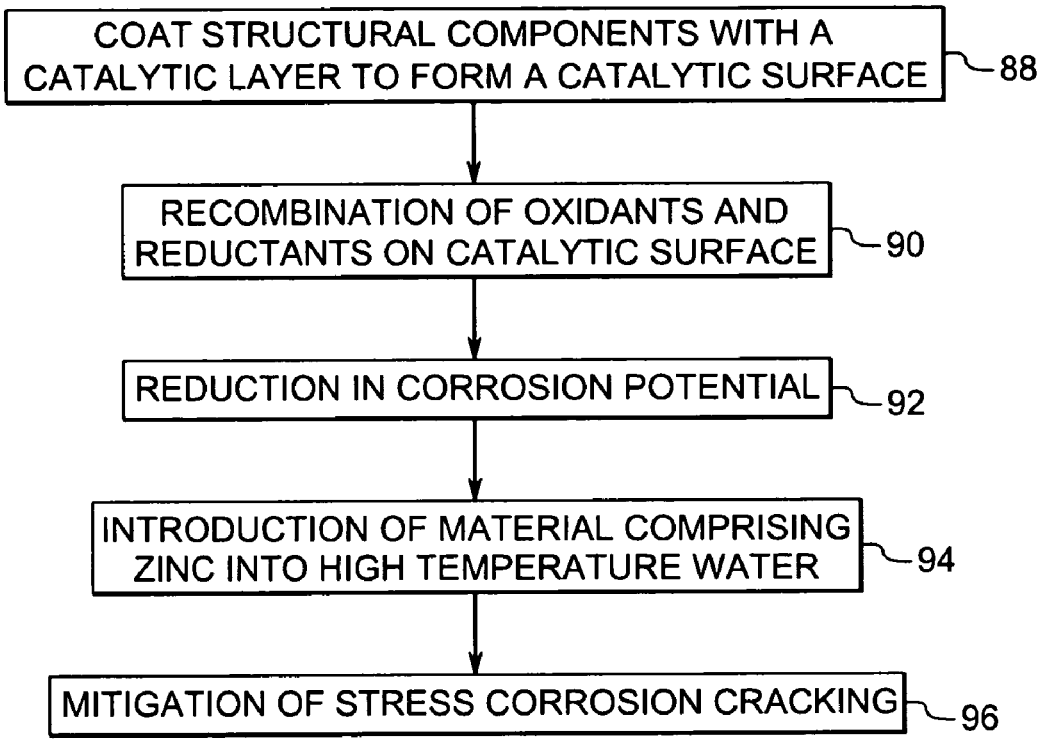

In some embodiments, as illustrated in method 86 of FIG. 6, low corrosion potential conditions may be achieved by coating the structural components exposed to high temperature waters with noble metal catalysts to form a catalytic surface, as indicated in block 88. A variety of deposition techniques including physical vapor deposition (e.g., glow-discharge sputtering, magnetron-based sputtering, or electro plating), electroless plating, RF sputtering, thermal spraying by plasma or high velocity oxygen fuel thermal spray process, wire-arc, or chemical vapor deposition, diffusion bonding, thermo-mechanical cladding may be used for coating. The catalytic surface enhances the recombination of oxidants and reductants as shown in block 90. This leads to reduction of corrosion potential as depicted in block 92. Material comprising zinc is introduced into the high temperature water (block 94) to utilize the benefit of reduced corrosion potential and to achieve better penetration into cracks and hence reduction in stress corrosion cracking of components (represented in block 96). Material comprising zinc may be in any form as discussed in the above embodiment.

Figure 7:
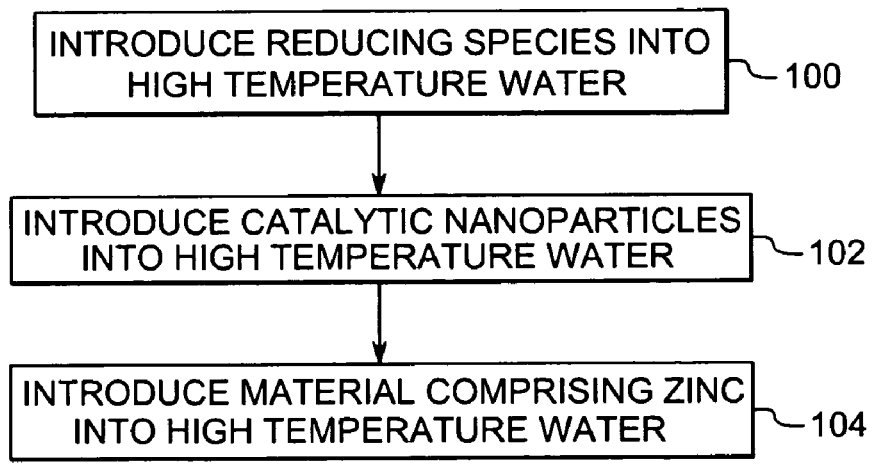

In some other embodiments as illustrated by method 98 of FIG. 7, lowering corrosion potential conditions involves introducing a plurality of catalytic nanoparticles into the high temperature water environment (block 100). Examples of catalytic nanoparticles include nanoparticles of palladium, platinum, osmium, rhodium, ruthenium, iridium, rhenium, oxides thereof, nitrides thereof, alloys thereof, or various combinations thereof. Additionally, the catalytic nanoparticles may comprise other chemical compounds containing platinum, or palladium, or osmium, or ruthenium, or iridium, or rhodium. Such compounds include intermetallic phases or solid-state solutions. The plurality of catalytic nanoparticles provides a catalytic surface on which the reducing species react with at least one oxidizing species, thereby reducing the concentration of at least one oxidizing species within the high temperature water and, hence, achieving a lowering of the corrosion potential. In some embodiments, the act of introducing the plurality of catalytic nanoparticles comprises providing a concentration of the plurality of catalytic nanoparticles in the high temperature water environment in a range from about 5 parts per billion to about 200 parts per billion. A material comprising zinc is introduced into the high temperature water as indicated in block 104. Under low corrosion potential condition facilitates better penetration of zinc into crevices or cracks and helps in achieving mitigation of stress corrosion cracking Several options are available for introducing the catalytic nanoparticles in situ into the high temperature water to lower the corrosion potential. The catalytic nanoparticles can be introduced homogeneously so as to create a colloidal suspension within the system, wherein the catalytic nanoparticles remain in suspension indefinitely due to Brownian motion. Alternatively, the catalytic nanoparticles can be introduced heterogeneously.

The catalytic nanoparticles may be introduced into to the high temperature water, by first preparing a concentrated solution or suspension of the catalytic nanoparticles using suitable fluid media. Subsequently, the concentrated suspension of catalytic nanoparticles can be delivered to the reactor feedwater. Suitable media for forming such concentrated solutions or suspensions include water; alcohols such as methanol, ethanol, propanol, and n-butanol; and acids such as lower carboxylic acids, e.g. acetic acid, propionic acid, and butyric acid; or ketones such as acetone and acetylacetone; and combinations thereof. The catalytic nanoparticles may be introduced in a nondispersed metallic form into the reactor feedwater. In another embodiment, the catalytic nanoparticles can be mixed with at least one of a transition metal oxide powder and a transition metal powder to form a powder mixture. The transition metal oxide powder may comprise zinc oxide, iron oxide, or the like and the transition metal powder may comprise zirconium, yttrium, iron, zinc, hafnium, cerium, or the like. The catalytic nanoparticles may be introduced into the high temperature water by first forming a shaped pellet comprising the catalytic nanoparticles and one of the transition metal oxide powder and transition metal powder and subsequently delivering the shaped pellet into the high temperature water.

In yet another embodiment, the catalytic nanoparticles are introduced into the high temperature water by coating a substrate with the catalytic nanoparticles to form at least one coated substrate, and delivering the coated substrate to the high temperature water. Once in the high temperature water stream, the catalytic nanoparticles detach from the substrate to form a colloidal suspension in the high temperature water stream.

The catalytic nanoparticles may be introduced into the high temperature water during various stages of operation of the reactor. The catalytic nanoparticles may be provided to the high temperature water in any of the embodiments described above during full power operation, cool down, heat-up, hot standby, or low power operation of the reactor.

The catalytic nanoparticles may be introduced into the high temperature water at any location within the reactor structure where thorough mixing of the catalytic nanoparticles in the high temperature water can occur. The locations at which the catalytic nanoparticles may be introduced into the high temperature water include residual heat removal (RHR) piping, recirculation piping, feedwater lines, core delta P lines, jet pump instrumentation lines, control rod drive cooling water lines, water level control points, reactor water clean-up (RWCU) systems, and the like. The various lines not used for injection purposes may be either open or closed to the remainder of the coolant system during introduction of the catalytic nanoparticles.

Figure 8:
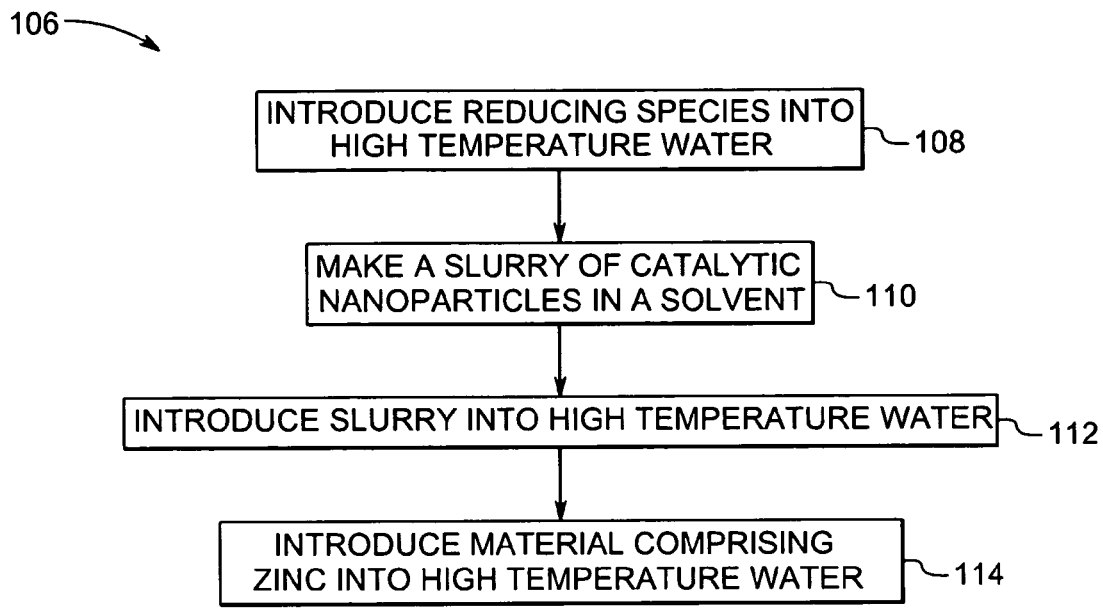

In some embodiments such as illustrated by method 106 of FIG. 8, catalytic nanoparticles may be introduced subsequent to introduction of reducing species (step 108) to limit the amount of reducing species needed to achieve a desired lowering of the corrosion potential. For example, a slurry of catalytic nanoparticles in a suitable medium is prepared in step 110 and the slurry is introduced into the high temperature water. The plurality of catalytic nanoparticles provides a catalytic surface on which the reducing species react with at least one oxidizing species, thereby reducing the concentration of at least one oxidizing species within the high temperature water and, hence, achieving a reduction of the corrosion potential. In step 114, a material comprising zinc is introduced into the high temperature water. Under reduced corrosion potential conditions, zinc may penetrate better into the cracks and hence prevents further propagation of the crack. In certain embodiments, material comprising zinc may include zinc, or zinc oxide, or zinc nitrate, or zinc acetate or other organo-metallic compounds containing zinc or combinations thereof. In some embodiments zinc is introduced in the form of nanoparticles. The material comprising zinc may be introduced in the form of a powder, a pellet, a non-dispersed metallic form, a coated substrate, or a combination thereof.

Figure 9:
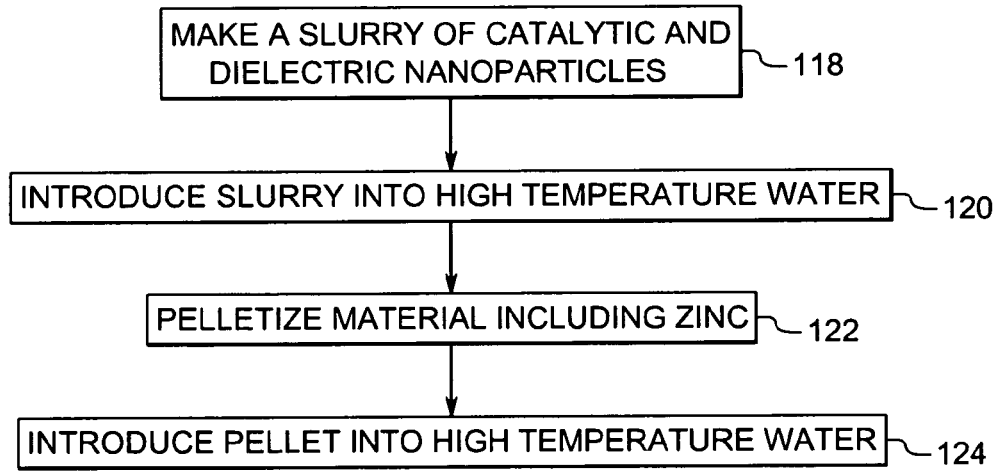
Figure 10:
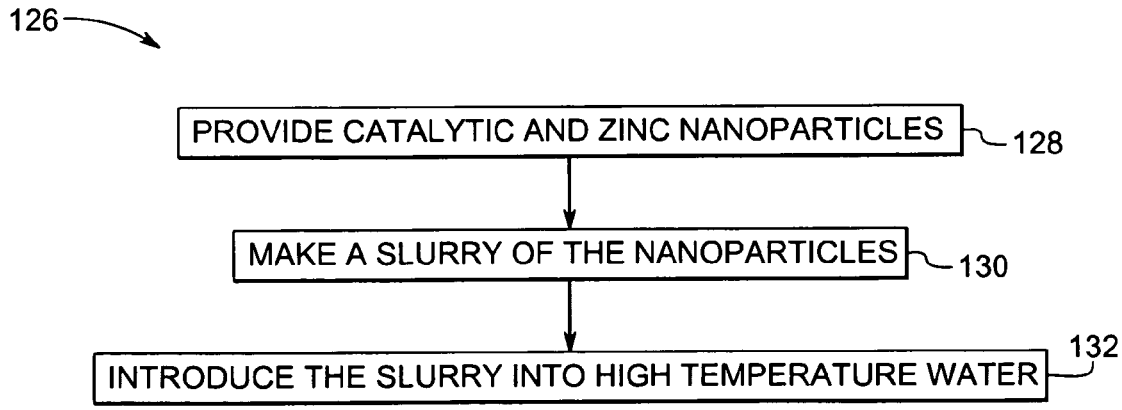

In some embodiments, lowering the corrosion potential conditions comprises introducing a plurality of dielectric nanoparticles. In some embodiments, the dielectric nanoparticles may be added along with catalytic metal nanoparticles as illustrated in FIG. 9 as method 116. For example, certain embodiments of dielectric nanoparticles comprise a non-noble metal including zirconium, or hafnium, or niobium, or tantalum, or yttrium, or tungsten, or vanadium, or titanium, or molybdenum, or chromium, or cerium, or germanium, or scandium, or lanthanum, or oxides thereof, or combinations thereof. Upon introduction of the nanoparticles into the high temperature water, the nanoparticles are colloidally dispersed in the water to hinder the detrimental effects of the high temperature water. In particular, the catalytic nanoparticles catalytically increase the efficiency of the recombination kinetics for hydrogen and oxygen to lower the electrochemical corrosion potential of wetted surfaces. The dielectric nanoparticles provide an electrically insulating layer to reactor surfaces. The terms electrically insulating means more electrically insulating than an oxide of the underlying material of the structural component. Some of the nanoparticles, e.g., catalytic noble metal component and/or dielectric component, may also deposit onto surfaces of the components in contact with the high temperature water to provide continued stress corrosion crack mitigation. Once deposited onto the component surfaces, the nanoparticles may redeposit onto other component surfaces during operation or the nanoparticles may become colloidally dispersed in the high temperature water.

Upon introduction of the nanoparticles into the reactor water, the nanoparticles are colloidally dispersed and are responsive to electrostatic forces in the water. As a result, redistribution of the nanoparticles can occur on various component surfaces of the reactor. In addition, the catalytic efficiency is greatly improved due to the increased surface area provided by the use of nanoparticles as compared with coated particles. In addition, such nanoparticles are capable of penetrating or diffusing into the existing crevices or cracks and, thus, inhibit growth of cracks.

In one embodiment, a mixture of nanoparticles including both dielectric nanoparticles and catalytic nanoparticles are made into a slurry as shown in block 118 of FIG. 9. The slurry is into introduced into the high temperature water in step 120. In another embodiment, each nanoparticles is fabricated as a mixture of both the dielectric component and the catalytic component, wherein all or a portion of the catalytic component contacts the high temperature water upon immersion therein. Advantageously, the use of the nanoparticles as disclosed herein reduces the electrochemical corrosion potential without the need to continuously monitor variables such as dissolved hydrogen/oxygen levels, which are generally difficult to accurately monitor in boiling water reactors and other reactors. In step 122, the material comprising zinc is pelletized and the pellet is introduced into the high temperature water as shown in block 124.

The nanoparticles may have a variety of morphologies, including single-lobed such as spherical, substantially spherical, cigar-shaped, rod-shaped and moon-shaped, and multi-lobed such as tetrahedral, raspberry, acorn, dumb-bell, and the like. The size distribution of the nanoparticles may be a monodispersion, bimodal, or polydispersion. In one embodiment, the nanoparticles have average diameter of less than about 500 nanometers, in another embodiment, the nanoparticles have average diameter of less than about 100 nanometers, and in yet another embodiment, the nanoparticles have average diameter of less than about 50 nanometers.

The nanoparticles are formed using conventional techniques leading to a wide variation in the amount of agglomeration of particles. As those skilled in the art will appreciate, the stoichiometric ratio of the metals (non-noble metals and noble metals) will establish the ratio of the metal in the final product. In certain embodiments, nanoparticles are dispersed to take advantage of their unique properties. Particle dispersion can be divided into three stages: wetting;

separation of particles; and stabilization. Once wetted, the breakdown of agglomerates is usually achieved by collision or attrition. Methods used to disperse the nanoparticles include ultrasonic energy, vigorous mixing, vigorous spraying, and the like. Nanoparticles, once dispersed, can remain in a colloidal suspension indefinitely due to Brownian motion.

Oxidizing species present in the high temperature water include oxygen ($O_2$), hydrogen peroxide ($H_2O_2$), and various radicals, such as OH, and the like. Reducing species include hydrogen ($H_2$), hydrazine ($N_2H_2$), ammonia ($NH_3$), alcohols, and the like. In one preferred embodiment, a catalytic nanoparticle provides a catalytic surface upon which hydrogen reacts with oxygen and hydrogen peroxide to form water. The reductants may already be present in the high temperature reactor water in equilibrium concentrations. Alternatively, the reductants may be introduced into the high temperature water and dissolved therein. In one such embodiment, an amount of hydrogen gas is introduced into the high temperature water such that the ratio of $H_2O_2$ in the high temperature water has a value determined by weight of about 1:8.

The dielectric nanoparticles preferably comprise a non-noble metal material. Suitable dielectric materials for fabricating the nanoparticles include inorganic or organometallic compounds, metals, zeolites, metal oxides, and the like. Non-limiting examples of non-noble metals include zirconium, hafnium, niobium, tantalum, yttrium, ytterbium, tungsten, vanadium, titanium, molybdenum, chromium, cerium, germanium, scandium, lanthanum, and nickel. It is also possible to use non-noble metals that possess conducting or semiconducting properties such as carbon or silicon. The non-noble metal identified above can be used alone or in admixture with other non-noble metals or non-metals.

The ratio of catalytic nanoparticles to dielectric nanoparticles will depend on the desired application and can vary widely as any ratio can be employed. Upon introduction into the reactor water, the concentration of the catalytic nanoparticles is preferably less than about 100 parts per billion (ppb), preferably about 1 parts per trillion (ppt) to about 10 ppb, and even more preferably, about 10 ppt to about 1 ppb. The concentration of the dielectric nanoparticles is preferably less than about 100 ppb, preferably about 1 ppt to about 10 ppb, and even more preferably, about 10 ppt to about 1 ppb.

In one embodiment of the present invention, the nanoparticles are deposited onto the component surfaces to provide a heterogeneous catalysis site and form a protective insulative layer. In another embodiment, however, the majority of nanoparticles are sufficiently buoyant to remain in a colloidal suspension in the high temperature water. In this colloidal suspension, the nanoparticles act as homogenous catalysts for the reaction between oxidizing and reducing species within the high temperature water and, also, provide insulative properties due to the proximity of the dielectric nanoparticles to the reactor surfaces. This method of providing the nanoparticles to the high temperature water may require that injection of the reductant (e.g., $H_2$) be temporarily suspended when the nanoparticles are initially introduced into the reactor to minimize the production of N-16 containing species. The electrochemical corrosion potential of the reaction components can be lowered in situ by injecting the nanoparticles directly into the reactor feedwater, thus eliminating the need to remove the components for treatment with noble metal powders. The nanoparticles may be provided to the reactor feedwater during reactor operation, thus avoiding expensive and complicated reactor shutdowns. Alternatively, the nanoparticles may be added to the reactor feedwater during a scheduled reactor shutdown. Depending on the needs of the respective nuclear reactor, a predetermined amount of the nanoparticles can be introduced into the high temperature water in the reactor either continuously or incrementally at predetermined time intervals. Predetermined quantities of the catalytic nanoparticles can be introduced into the reactor to obtain a predetermined concentration of the catalytic nanoparticles in the high temperature reactor water.

The nanoparticles may be introduced into the high temperature water during various stages of operation of the reactor. The nanoparticles may be provided to the high temperature water in any of the embodiments described above during full power operation, cool down, heat-up, hot standby, or low power operation of the reactor. Moreover, the nanoparticles may be introduced into the high temperature water at any location within the reactor structure where thorough mixing of the nanoparticles in the high temperature water can occur. The locations at which the nanoparticles may be introduced into the high temperature water include residual heat removal (RHR) piping, recirculation piping, feedwater lines, core delta P lines, jet pump instrumentation lines, control rod drive cooling water lines, water level control points, reactor water clean-up (RWCU) systems, and the like. The various lines not used for injection may be either open or closed to the remainder of the coolant system during introduction of the catalytic nanoparticles.

In some embodiments, low corrosion potential is achieved by coating the components exposed to high temperature waters with an electrically insulating material. The terms electrically insulating means more electrically insulating than an oxide of the underlying material of the structural component. Various insulating layers may be formed on these metal alloy coatings, but oxides, carbides, and nitrides of these alloys are generally most compatible with high-temperature water applications. In the case of zirconium-based alloys, the insulating layer could be an oxide of the alloy, which would comprise zirconia. Zirconia ($ZrO_2$) is a good initial choice because it forms spontaneously in air or water, and it also may be applied by thermal spraying. Zirconia is also very stable in high-temperature water, both structurally (e.g., it is not prone to spalling and is not susceptible to environmentally assisted cracking) and chemically (e.g., it does not dissolve or react). Zirconia or other forms of zirconium alloys can also be obtained in various particle sizes, so that there is flexibility in adjusting the thermal spray parameters, where thermal spraying, sputtering, physical vapor deposition, or chemical vapor deposition is used for forming the insulating layer. Alumina is also an option. The dissolution rate of alumina in 288° Celsius water is higher than that for zirconia, but is still very low. Various other metal oxides, carbides, nitrides or borides may also be suitable, so long as they are mechanically and chemically stable in a high-temperature water environment, including not being subject to dissolution in high-temperature water and not being subject to spalling under the normal operating condition of the high-temperature water system. It should be noted that the insulating layer formed on the surface of the metal alloy coating may not be the same insulating layer (e.g. an oxide) that will form in pores, cracks or crevices as they are exposed high temperature water.

In some exemplary embodiments, the act of introducing material comprising zinc into the high temperature water comprises introducing a plurality of nanoparticles comprising zinc. In certain embodiments, material comprising zinc may include zinc, or zinc oxide, or, or zinc nitrate, or zinc acetate, or any other organo-metallic compound containing zinc, or combinations thereof. The material comprising zinc may be introduced as discussed in the above embodiments, in the form of a powder, a pellet, a non-dispersed metallic form, a coated substrate, or a combination thereof. Now reference is made to FIG. 10, which illustrates a method 126 to mitigate stress corrosion cracking, in accordance with some embodiments of the invention involving nanoparticles of zinc. It involves providing nanoparticles of zinc and catalytic nanoparticles at step 128, and making a slurry of the nanoparticles in step 130 and introducing the slurry at step 132. Nanoparticles of zinc may be preferred in some embodiments as they get into small crevices better and hence prevent the growth of cracks.

In embodiments employing catalytic nanoparticles and zinc, one or more materials comprising catalytic nanoparticles and zinc may be introduced together or separately. In some embodiments, introducing a source of catalytic nanoparticles and zinc into the high temperature water includes introducing them in the form of a powder, or a slurry, or a pellet, or a coated substrate, or in a non dispersed metallic form, or combinations thereof. Generally, catalytic nanoparticles and zinc are introduced into high temperature water to achieve a predetermined concentration of catalytic particles and zinc in the high temperature water. In some embodiments, the concentration of zinc is greater than 1 parts per billion, or from about 50 to 100 parts per billion, or in some embodiments, the concentration of catalytic nanoparticles is lower than 200 parts per billion. The source of catalytic nanoparticles and zinc may be introduced into the high temperature water continuously or intermittently delivering a predetermined amount of the source.

It is well known that zinc enhances the repassivation kinetics, especially at longer times, by incorporating into the oxide film and reducing the passive current density. As seen FIG. 11, in the presence of 10 ppb zinc, the crack growth rate (CGR) is decreased, suggesting that zinc promotes more defect-free oxide film on stainless steel. In addition, it is demonstrated, in FIG. 12, that zinc decreases the crack growth rate in high temperature water containing hydrogen and at low corrosion potential (from $2.9 \times 10^{-8}$ mm/s to $8.3 \times 10^{-9}$ mm/s).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for mitigating stress corrosion cracking of a component exposed to a high temperature water in a high temperature water system, the method comprising:
    reducing corrosion potential conditions to a desired low corrosion potential in the high temperature water environment; and
    introducing a first material comprising zinc into the high temperature water environment, such that the desired low corrosion potential facilitates transport of the first material into cracks in a structure communicative with the high temperature water environment.

2. The method of claim 1, wherein reducing corrosion potential conditions comprises introducing a plurality of catalytic nanoparticles including a second material into the high temperature water environment.

3. The method of claim 2, wherein the second material comprises a noble metal including palladium, or platinum, or osmium, or rhodium, or ruthenium, or iridium, or rhenium, or oxides thereof, or nitrides thereof, or borides thereof, or combinations thereof, or alloys thereof.

4. The method of claim 2, wherein the plurality of catalytic nanoparticles has an average particle size of less than 500 nm.

5. The method of claim 2, wherein introducing the plurality of catalytic nanoparticles comprises providing a concentration of the plurality of catalytic nanoparticles in the high temperature water environment in a range from about 5 parts per billion to about 200 parts per billion.

6. The method of claim 1, wherein reducing corrosion potential conditions comprises introducing a plurality of dielectric nanoparticles comprising a second material.

7. The method of claim 6, wherein said plurality of dielectric nanoparticles comprises a non-noble metal including zirconium, or hafnium, or niobium, or tantalum, or yttrium, or tungsten, or vanadium, or titanium, or molybdenum, or chromium, or cerium, or germanium, or scandium, or lanthanum, or oxides thereof, or combinations thereof.

8. The method of claim 1, wherein reducing corrosion potential conditions to the desired low corrosion potential comprises providing an effective amount of a second material to lower the corrosion potential to a value in the range from about −500 milli volts to about 100 milli volts with respect to a standard hydrogen electrode.

9. The method of claim 8, wherein reducing corrosion potential conditions to the desired low corrosion potential comprises providing an effective amount of a second material to lower the corrosion potential to a value less than 0 millivolts with respect to a standard hydrogen electrode.

10. The method of claim 1, wherein reducing corrosion potential conditions comprises introducing a reducing species.

11. The method of claim 10, wherein said reducing species comprises one including hydrogen, or alcohol, or hydrazine, or ammonia, or combinations thereof.

12. The method of claim 1, wherein introducing the first material comprises introducing a plurality of nanoparticles comprising the first material.

13. The method of claim 1, wherein the first material comprises metallic zinc, or zinc oxide, or zinc nitrate, or zinc acetate, or combinations thereof.

14. A method for mitigating stress corrosion cracking, comprising:
    reducing corrosion potential via introducing a plurality of catalytic nanoparticles in a high temperature water system; and
    inducing, via an effective reduction of corrosion potential, entry of a material comprising zinc into a stress crack in a component in the high temperature water system.

15. The method of claim 14, wherein introducing the plurality of catalytic nanoparticles comprises introducing a source of catalytic nanoparticles and zinc into the high temperature water in the form of a powder, or a slurry, or a pellet, or a coated substrate, or a coating, or a chemical alloy or a mechanical alloy or in a non dispersed metallic form, or combinations thereof.

16. The method of claim 15, wherein introducing the source of catalytic nanoparticles and zinc into the high temperature water comprises achieving a predetermined concentration of catalytic particles and zinc in the high temperature water.

17. The method of claim 15, wherein introducing the source of catalytic nanoparticles and zinc into the high temperature water comprises continuously or intermittently delivering a predetermined amount of the source.

18. The method of claim 15, wherein the source of catalytic nanoparticle and the material comprising zinc are introduced together.

19. A method for mitigating stress corrosion cracking, comprising:
   catalytically recombining oxidants and reductants to reduce corrosion potential in a high temperature water system; and
   inducing, via an effective reduction of corrosion potential, entry of a first material comprising zinc into a stress crack in a component in the high temperature water system.

20. The method of claim 19, wherein the plurality of the nanoparticles have a mean particle size less than about 500 nanometers.

21. The method of claim 19, wherein the high temperature water system is a nuclear reactor, or a steam turbine, or a water deareator, or a jet pump.

22. The method of claim 21, wherein the nuclear reactor is a boiling water nuclear reactor.

23. The method of claim 19, wherein introducing the first material comprises introducing a plurality of nanoparticles comprising the first material.

24. A method for mitigating stress corrosion cracking, comprising:
   reducing corrosion potential conditions in a high temperature water environment;
   inducing, via an effective reduction of the corrosion potential conditions, entry of a material comprising zinc into a stress crack in a component in the high temperature water system; and
   preventing or substantially reducing further growth of the stress crack via the entry of the material comprising zinc into the stress crack.

* * * * *